UNITED STATES PATENT OFFICE.

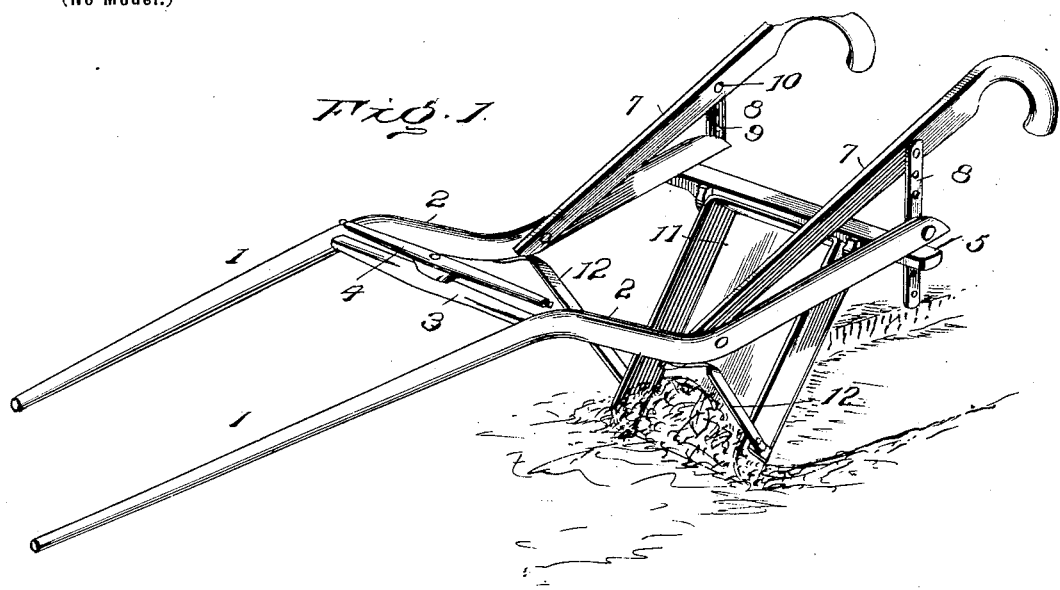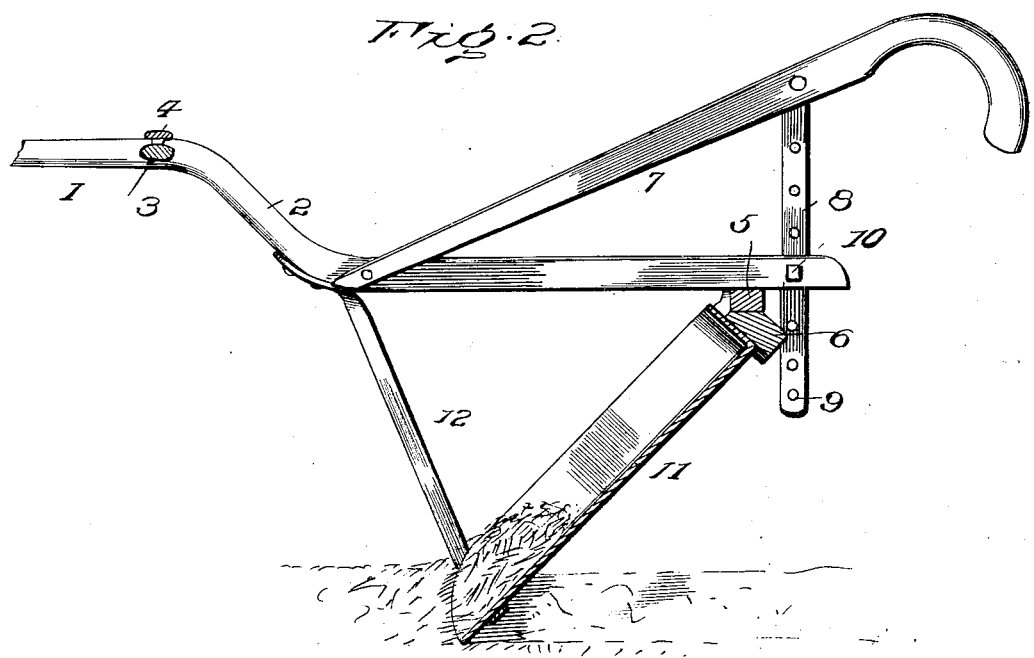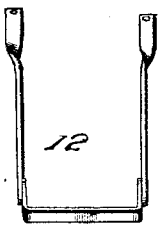

FREDERICK WILLIAM SMITH, OF CAMPBELL, CALIFORNIA.

CHECK-BLOCKER FOR IRRIGATING.

SPECIFICATION forming part of Letters Patent No. 711,079, dated October 14, 1902.

Application filed March 25, 1902. Serial No. 99,952. (No model.)

*To all whom it may concern:*

Be it known that I, FREDERICK WILLIAM SMITH, a citizen of the United States, residing at Campbell, in the county of Santa Clara and State of California, have invented certain new and useful Improvements in Check-Blockers for Irrigating; and I do hereby declare the following to be a full, clear, and exact description of the invention, such as will enable others skilled in the art to which it appertains to make and use the same.

The implement is designed to save time and labor in preparing land for irrigating.

It is customary to plow furrows or checks for distributing and holding the water on the land, and where the checks cross there is left an opening which it is the purpose of the present invention to close and prevent the water from passing through. This is necessary to prevent the water settling on the lower land and to secure a nearly equal distribution of the water on high and low land. The checks are generally blocked up by hand, the operation being tedious, slow, and costly. The present invention provides an implement which will enable one man and horse to do the work of about twenty men by hand in the same time and in a more satisfactory manner.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of an implement embodying the invention. Fig. 2 is a side view thereof. Fig. 3 is a front view of the shovel.

Corresponding and like parts are referred to in the following description and indicated in all the views of the drawings by the same reference characters.

The implement comprises longitudinal bars 1, offset near their rear ends, as shown at 2, whereby the rear parts are in a lower plane than the front portions of the said bars. A cross-bar 3 connects the longitudinal bars 1 immediately in advance of the offset portions 2 and is provided with a singletree 4, to which the draft-animal is hitched for drawing the implement over the field. A cross-bar 5 connects the rear ends of the bars 1, and a head-block 6 is attached thereto in any substantial way. The handles 7 have pivotal connection at their lower ends with the bars 1 immediately in the rear of the offset portions 2, and braces 8 support the rear ends of the handles in an adjusted position, said braces being provided with a series of openings 9 to receive pins or fastenings 10, passed through openings in the rear ends of the bars 1.

The shovel 11 is of scoop form and its bottom is flat and is closed at its sides and rear by means of a flange. This shovel is forwardly and downwardly inclined, and its rear end is rigidly attached to the head-block 6. A stirrup 12 has the upper ends of its side members firmly attached to the offset portions of the longitudinal bars 1 and its lower horizontal portion made fast to the lower end of the shovel 11, so as to brace the latter.

The longitudinal bars 1, with the cross-bar 3 and singletree 4, constitute a pair of thills, to which the draft-animal is hitched in the usual way. The implement is drawn over the field after the manner of a plow and forms the trench into which the water is admitted. These trenches are arranged in parallel lines longitudinally and transversely of the field, and at the point of intersection where it is required to form a block wingdams are provided, this being accomplished in a simple manner by means of the present implement simply by lifting the handles, thereby permitting the earth in front of the shovel to drop.

Having thus described the invention, what is claimed as new is—

The herein-described irrigating-plow comprising longitudinal bars offset between their ends, cross-bars connecting the longitudinal bars forward and in the rear of the offset portions, a singletree being applied to the front cross-bar, a head-block attached to the rear cross-bar, a shovel connected at its upper rear end to the said head-block and inclined forwardly and downwardly, a stirrup having its lower portion secured to the lower front end of the shovel and having the upper ends of the side members attached to the offset portions of the longitudinal bars, handles pivotally connected to the longitudinal bars, and braces adjustably connecting the handles with the rear ends of said longitudinal bars, substantially as set forth.

In testimony whereof I affix my signature in presence of two witnesses.

FREDERICK WILLIAM SMITH. [L. S.]

Witnesses:
JOSEPH G. SMITH,
I. PRESTON.